United States Patent [19]

Stivers

[11]  3,723,577

[45]  Mar. 27, 1973

[54] FLUORINATED ELASTOMER BLENDS
[75] Inventor: David A. Stivers, Saint Paul, Minn.
[73] Assignee: Minnesota Mining and Manufacturing Company, St. Paul, Minn.
[22] Filed: Nov. 5, 1970
[21] Appl. No.: 87,359

[52] U.S. Cl. ............ 260/900, 260/23.5 R, 260/41 A, 260/41 B, 260/41 R, 260/827, 260/859 R
[51] Int. Cl. ............................................. C08f 29/22
[58] Field of Search .......... 260/900, 92.1 S, 899, 827, 260/859

[56] References Cited

UNITED STATES PATENTS

| | | | |
|---|---|---|---|
| 3,142,660 | 7/1964 | Conger | 260/47 |
| 3,105,827 | 10/1963 | Kaufman | 260/45.5 |
| 3,030,260 | 4/1962 | Metzler et al. | 156/305 |
| 3,025,183 | 3/1962 | Yuan | 117/126 |
| 3,019,206 | 1/1962 | Robb | 260/29.6 |
| 2,854,699 | 10/1958 | Robb | 18/55 |
| 3,560,595 | 2/1971 | Phillips et al. | 260/900 |

*Primary Examiner*—Samuel H. Blech
*Assistant Examiner*—C. J. Seccuro
*Attorney*—Kinney, Alexander, Sell, Steldt & Delahunt

[57] ABSTRACT

A fluoroelastomer combination is provided having improved processing and handling characteristics. The fluoroelastomer combination comprises at least two highly fluorinated elastomeric polymers, one of said polymers being dispersed throughout a continuous phase of the other of said polymers.

5 Claims, No Drawings

FLUORINATED ELASTOMER BLENDS

BACKGROUND OF THE INVENTION

1. Field of the Invention

This invention relates to fluorinated elastomers and, more particularly, to blends of fluorinated elastomers.

2. Description of the Prior Art:

Elastomeric fluorinated polymers of various types have been known for some time, e.g., see U.S. Pat. Nos. 2,752,331, 2,968,649, 3,051,677, 3,318,854, 3,331,823, and 3,179,619. These elastomeric polymers are very useful because of their desirable chemical and physical properties, e.g., chemical resistance and thermal stability. Certain of these elastomeric polymers also have other very desirable properties such as good tear strength, good tensile strength and elongation, etc.

Generally, when polymers are blended together, the resulting mixture exhibits properties which are a weighted average of the corresponding properties of the starting polymers. Thus, an improvement in one property is usually obtained at the expense of another desirable property.

Although blends of certain fluorinated polymers have been described, e.g., see U.S. Pat. Nos. 2,789,959, 2,789,960, 2,927,908, 3,019,206, 3,075,939, 3.105,827, 3,291,864, and 3,484,503, such blends have not suggested the fluoroelastomer combination of my invention.

SUMMARY OF THE INVENTION

In accordance with the invention an elastomeric fluorinated polymer is modified with another elastomeric fluorinated polymer so as to provide a fluoroelastomer combination which, without significant loss of thermal stability or solvent resistance, has a balance of physical characteristics superior to those of either starting elastomer and which, since the components are all elastomeric in nature, can be readily processed over a wide range of respective elastomer concentrations.

Thus, there is provided a thermally stable, chemical-resistant fluoroelastomer combination of improved processing and handling properties comprising at least two highly fluorinated elastomeric polymers. The first of said polymers is in the form of a continuous phase and at least one other polymer is dispersed throughout said first polymer.

Useful highly fluorinated elastomeric polymers are those which contain at least 37 percent by weight of carbon-bonded fluorine and, preferably, those polymers in which at least 50 percent of the non-skeletal carbon valence bonds are to fluorine. The useful polymers are those which are elastomeric. For this purpose I adopt the definition of elastomer contained in ASTM Special Technical Publication No. 184 (1956). Elastomer is defined there as a substance that can be stretched at room temperature to at least twice its original length, and, after having been stretched and the stress removed, returns with force to approximately its original length in a short time.

The useful highly fluorinated elastomeric polymers can be prepared by condensation reactions, e.g., to form polymers such as fluorosilicones, (e.g. based on $(CF_3CH_2CH_2)_aSiX_{4-a}$ where X is OH or Cl) fluorinated urethanes, fluorinated polyesters (e.g. based on $HOCH_2(CF_2)_4CH_2OH$), and the like; they can also be prepared by addition reactions. Preferred elastomeric addition polymers are the saturated polymers derived from mono-ethylenically unsaturated (vinyl) monomers or fluoroalkyl nitroso monomers. Monomers useful in preparing elastomeric addition polymers include:

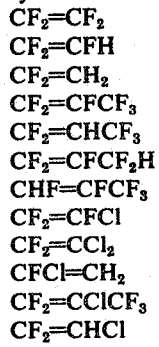

$CF_2=CF_2$
$CF_2=CFH$
$CF_2=CH_2$
$CF_2=CFCF_3$
$CF_2=CHCF_3$
$CF_2=CFCF_2H$
$CHF=CFCF_3$
$CF_2=CFCl$
$CF_2=CCl_2$
$CFCl=CH_2$
$CF_2=CClCF_3$
$CF_2=CHCl$

One preferred embodiment of the invention comprises a thermally stable, chemical-resistant fluoroelastomer combination of improved processing and handling properties which comprises at least two highly fluorinated elastomeric polymers wherein one of said polymers is chlorine-free and another of said polymers is chlorine-containing. One of the polymers is in the form of a continuous phase and another of the polymers is dispersed throughout the continuous phase polymer.

By chlorine-free polymer I mean that the highly fluorinated elastomeric polymer does not contain a significant amount of chlorine, i.e., less than about one weight percent. Examples of preferred chlorine-free polymers are those elastomeric copolymers of $CF_2=CH_2/CF_3CF=CF_2/CF_2=CF_2$, $CF_2=CH_2/CF_3CF=CF_2$ and $CF_2=CH_2/CF_3CF=CFH$. An example of a chlorine-containing polymer is an elastomeric copolymer of $CF_2=CH_2$ and $CF_2=CFCl$.

The fluoroelastomer combination can include from about 3 to about 97 weight percent of the chlorine-containing polymer. Generally, for improving tear strength of the chlorine-free polymer, concentrations of 3 to 30 weight percent of the chlorine-containing polymer are preferred and concentrations of about 5 to 20 weight percent are even more preferred. The processing and handling, i.e. calendering, extruding, molding, etc., of the chlorine-containing polymer are improved by dispersing therethrough about 3–40 weight percent or more of a chlorine-free polymer without the loss of advantageous properties such as solvent resistance, thermal stability, resistance to aging, which occurs when conventional processing aids are used.

When each of the highly fluorinated elastomeric polymers are to be cured and reinforced by the same compounding agents, one method of preparing the fluoroelastomer combination is by mixing or compounding the desired curable polymer gum stocks together in the desired proportions by using any of the usual rubber mixing devices, such as Banbury mixers, roll mills, or any other convenient mixing device. After the polymer gum stocks have been so blended, the modifying agents, pigments, reinforcing agents and curatives may be added to the blended elastomeric polymers. It is also possible, and generally preferred, to first blend the desired pigments, modifying agents, reinforcing agents and curatives into each of the curable elastomeric polymers separately before the polymers are blended with each other. Using this latter method permits one to use different amounts and types of curing agents and fillers in each type of elastomeric polymer.

For the blending it has been found that a two-roll rubber mill equipped with heat exchange means, e.g., cored chambers for cooling, is particularly suitable since the heat generated by the high shearing forces in mixing can be dissipated and the temperature more accurately regulated with this device or with devices providing other means for temperature control. For best results the temperature of the material on the mill is not allowed to rise above about 250° F. (120° C.) and is not allowed to fall below 30° F. (0° C.). During milling it is desirable to uniformly disperse one or more of the elastomeric polymers throughout another elastomeric polymer. However, prolonged milling is not desirable after the elastomeric polymers have been adequately mixed. Thus, it is not necessary that the dispersion be in the form of a solution of one polymer in another. For example, it has been observed that a thin film cast from a solution of an elastomeric copolymer of $C_3F_6/CF_2CH_2$ in diisobutyl ketone is completely transparent. Similarly a film cast from a solution of an elastomeric copolymer of $CF_2CH_2/CF_2CFCl$ in diisobutyl ketone is completely transparent. However, mixing the above two solutions together and then casting a film therefrom leaves a translucent film which indicates that these two polymers are not mutually soluble at room temperature.

The largest use of the fluoroelastomer combination of the invention is for O-rings, gaskets, shaft seals, sleeves, etc. Therefore, the blended polymers must be cured before they can be so used. The curing process typically comprises two steps. The first step is the pressing of the fluoroelastomer compounded dispersion into a mold and heating (press cure). The press cure is conducted at a temperature between about 275° F. (135° C.) and about 400° F. (205° C.), preferably between about 300° F. (150° C.) and about 345° F. (175° C.) for a period of from 5 minutes to about 1 hour. A pressure of between about 7 and about 210 kg/cm², and preferably between about 35 and about 70 kg/cm², is imposed on the compounded dispersion of polymers in the mold. The press-cured elastomer is then removed from the mold and placed in an oven for post-curing.

The press-cured elastomer must have sufficient strength and toughness to resist tearing or breaking under the stress required to remove it from the mold. The ability to so resist tearing or breaking is expressed herein as press cure tear strength.

The molded fluoroelastomer is usually post-cured (oven cured) at a temperature between about 300° F. (150° C.) and about 600° F. (315° C.), usually at about 400°–500° F. (205°–260° C.), for a period of from 2 hours to 50 hours depending on the cross-sectional thickness of the sample.

The following examples are provided to illustrate the present invention and are not to be construed as limiting the scope thereof.

EXAMPLE I

To illustrate the advantages (e.g. increased tear strength) obtained by blending varying amounts of a highly fluorinated, chlorine-containing elastomeric polymer with a highly fluorinated, chlorine-free elastomeric polymer, the formulations shown in Table I were prepared. Formulations 1, 2 and 11 were prepared by blending all of the stated ingredients together on a two-roll rubber mill. Each of the remaining formulations was prepared by first blending together, as a pre-mix, all the ingredients which are marked with an asterisk and then blending together, as another pre-mix, the remaining ingredients. The two pre-mixes were then blended together to form a fluoroelastomer combination comprising the curable elastomeric polymers, wherein the chlorine-containing polymer was dispersed throughout the continuous phase of the chlorine-free polymer.

In addition to the ingredients listed in Table I, formulations 1–4 contained 30 parts by weight of carbon black as a reinforcing pigment for the elastomeric polymers. The carbon black used was "Thermax", a tradename of R. T. Vanderbilt Company, Inc.

Formulations 1–14 also contained 1 part by weight of hydroquinone, 0.5 part by weight of cinnamylidenetrimethylenediamine, and 0.4 part by weight of

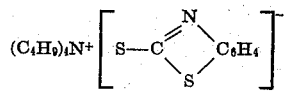

These ingredients, in addition to the MgO and $Ca(OH)_2$, comprised the curing system for the chlorine-free polymer. The curing system for the chlorine-containing polymer included MgO and hexamethylenediamine carbamate.

The silica used was a finely divided colloidal silica such as "Hi-Sil 223", a trade name of Pittsburgh Plate Glass. Silica is a preferred reinforcing agent for the chlorine-containing polymer.

The zinc stearate was used as a processing aid.

Formulation 15 comprised, in addition to the ingredients stated in Table I, 10 parts of zinc oxide (a common substitute for magnesium oxide), 10 parts of dibasic lead phosphite, 2.5 parts of Diak No. 1 (a blocked amine from DuPont) and 10 parts of diisobutyl ketone (a processing aid). This formulation was prepared by blending all of the noted ingredients together on a two roll rubber mill.

TABLE I

| Formulation | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ingredients, parts by weight: | | | | | | | | | | | | | | | |
| $CF_2CH_2/CF_3CFCF_2$ (75/25) | 100 | 100 | 100 | 100 | 100 | 100 | 100 | 100 | 100 | 100 | 100 | 100 | 100 | 100 | |
| $CF_2CH_2/CF_2CFCl$ (50/50) | | 10 | | | | | | | | | | | | | |
| $CF_2CH_2/CF_2CFCl$ (65/35) | | | *3 | *6 | *8 | *10 | *20 | *30 | *60 | *60 | 10 | *10 | *10 | *10 | 100 |
| Silica | | | *0.5 | *0.9 | *1.2 | *1.5 | *3 | *4.5 | *8.5 | *8.5 | | *1.5 | *1.5 | *2.5 | 15 |
| MgO | 10 | 10 | 10 | 10 | 10 | 10 | 10 | 10 | 10 | 10 | 15 | 10 | 10 | 10 | |
| | | | *0.3 | *0.6 | *0.8 | *1 | *2 | *3 | *6 | *6 | | *1 | *1 | *1 | |
| $Ca(OH)_2$ | 2 | 2 | 2 | 2 | 2 | 2 | 2 | 2 | 2 | 6 | 2 | 2 | 2 | 2 | |

Table I – Continued

| Ingredient | | | | | | | | | | | | | | | |
|---|---|---|---|---|---|---|---|---|---|---|---|---|---|---|---|
| Zinc stearate | 1 | 1 | 1 | 1 | 1 | 1 | 1 | 1 | 1 | 1 | 1 | 1 | 1 | 1 | |
|  |  | *0.1 | *0.1 |  |  |  |  |  |  |  |  | *0.2 | *0.2 | *0.2 | |
| Hexamethylene diamine carbamate |  | *0.08 | *0.1 | *0.1 | *0.1 | *0.2 | *0.3 | *0.6 | *0.6 | ___ | *0.3 | *0.25 | *0.25 | ___ | |
| Press-cure (20 min./168° C.) Hardness Shore A | 65–72 | 65 | 72 | 65 | 65 | 65 | 65 | 60 | 60 | 69 | ___ | ___ | 64 | 64 | 64 |
| Oven-cure (24 hrs./260° C.) Hardness Shore A | 72–80 | 73 | 78 | 78 | 74 | 76 | 76 | ___ | ___ | 77 | 76 | 76 | 76 | 80 | |
| Press cure tear strength, kg./cm | 10–11 | 19 | 13 | 20 | 19 | 26 | 29 | 30 | 25 | 27 | 15 | 23 | 27 | 39 | 36 |
| Oven cure tear strength, kg./cm | 13–14 | 14 | 12 | 15 | 16 | 16 | 19 | ___ | ___ | 14 | 17 | 18 | 18 | *34 | |

*Oven cure at 205° C.

The tear strength of the fluoroelastomer combinations was measured in accordance with ASTM Test Method D–624–54. The tests were run with die "C" and the tear strength was measured in units of kilograms per centimeter thickness. Generally, a press-cure tear strength of at least about 15 kg/cm is preferred for preventing tearing or breaking of the fluoroelastomer article when removing it from the mold.

EXAMPLE II

Fluoroelastomer combinations made from the formulation shown in Table II were prepared according to two different methods to show that prolonged or unnecessarily extended milling of the chlorine-containing polymer with the chlorine-free polymer is not needed, nor is it particularly desired when greatly improved tear strength is sought. For each method of preparation, the ingredients which are marked with an asterisk were first blended together as a pre-mix and the remaining ingredients were blended together as another pre-mix. The two pre-mixes were then blended together on a two-roll rubber mill.

TABLE II

| Ingredient | Parts by weight |
|---|---|
| $CF_2CH_2/CF_3CFCF_2$ (75/25) | 100 |
| $CF_2CH_2/CF_2CFCl$ (65/35) | 30* |
| Silica ("Hi-Sil 233") | 4.5* |
| MgO | 10 |
|  | 3* |
| $Ca(OH)_2$ | 2 |
| Carbon Black ("Thermax") | 30 |
| Zinc Stearate | 1 |
|  | 0.6* |
| Hydroquinone | 1 |
| $(C_4H_9)_4N^+ \left[ S-C \begin{smallmatrix} N \\ \diagdown \\ S \end{smallmatrix} C_6H_4 \right]^-$ | 0.4 |
| Cinnamylidenetrimethylenediamine | 0.5 |
| Hexamethylenediamine carbamate | 0.75* |
| Diisobutyl ketone (processing aid) | 3* |

According to one method of preparation, the premixes were blended together using a large two-roll rubber mill with tight clearance between the rolls. After the pre-mixes were thoroughly blended in the center one-third area of the rolls, cutting and banding was continued for about 30 minutes. Samples of the fluoroelastomer combination were then press cured and oven cured. The samples were tested in a manner similar to that used in Example I. The results were as follows:

Tear strength:
 Press cure (20 min./168° C.) 26 kg/cm
 Oven cure (24 hrs./260° C.) 20 kg/cm According to the other method of preparation, the pre-mixes were blended together using a small two-roll rubber mill with loose clearance between the rolls. The pre-mixes were blended together until it appeared that the chlorine-containing polymer had been adequately dispersed throughout the chlorine-free polymer. The material was then removed from the rubber mill without further milling. Samples of the fluoroelastomer combination were then press cured and oven cured, after which the samples were tested in a manner similar to that used in Example I. The results were as follows:

Tear strength:
 Press cure (20 min./168° C.) 31 kg/cm
 Oven cure (24 hrs./260° C.) 36 kg/cm Although both of the resulting fluoroelastomer combinations described in this example are within the scope of this invention, the preferred results are obtained when prolonged milling of the chlorine-containing polymer and the chlorine-free polymer is avoided. The polymers generally should not be milled together for a time longer than is needed to obtain a fairly uniform dispersion of one polymer throughout another polymer.

EXAMPLE III

A fluoroelastomer combination was prepared using the ingredients of Table III.

TABLE III

| Ingredient | Parts by weight |
|---|---|
| $CF_2CH_2/CH_3CFCF_2$ (75/25) | 100 |
| $CF_2CH_2/CF_2CFCL$ (65/35) | 40* |
| Silica ("Hi-Sil 233") | 6* |
| MgO | 10 |
|  | 4* |
| $Ca(OH)_2$ | 2 |
| Carbon Black ("Thermax") | 30 |
| Zinc Stearate | 1 |
|  | 10.8* |
| Hydroquinone | 1 |
| $(C_4H_9)_4N^+ \left[ S-C \begin{smallmatrix} N \\ \diagdown \\ S \end{smallmatrix} C_6H_4 \right]^-$ | 0.4 |
| Cinnamylidenetrimethylenediamine | 0.5 |
| Hexamethylenediamine carbamate | 1* |
| Diisobutyl ketone (processing aid) | 3* |

The method by which the ingredients were blended was the same as that described in Example II with the small two-roll rubber mill. After the polymers were adequately blended, the resulting dispersion was removed from the mill to avoid prolonged milling.

Samples of the fluoroelastomer combination were then press cured and oven cured after which they were tested in accordance with the methods of Example I. The results were as follows:

Tear strength:
 Press cure (20 min./68° C.) 30 kg/cm
 Oven cure (24 hrs./260° C.) 41 kg/cm Various curing systems may be used for curing the highly fluorinated elastomeric polymers used in the fluoroelastomer combinations of the invention. For example, standard curing systems for the vinylidene fluoride/chlorofluoroolefin elastomeric copolymers include peroxides, isocyanates, polyamines and quaternary salts. These curing systems may also be used in conjunction with known fillers such as silica, clay, carbon and pigments. The use of a peroxide or blocked amine cure in conjunction with silica reinforcing agents is particularly useful.

Similarly, known compounding systems for vinylidene fluoride/perfluoropropene copolymers can be used, including curing systems such as peroxides, amines, blocked amines, quaternary salts, aromatic nucleophiles, polyethers, etc. These curing systems may be used separately or in combination with each other and they may also be used in conjunction with reinforcing pigments (e.g. carbon black, silica, clay), colorants, plasticizers, processing aids and the like.

Although it is not necessary to include any silica in the fluoroelastomer combinations of the invention, it is preferred to include from 1 to 40 weight percent based on the weight of the chlorine-containing polymer. When silica is included in the formulation, it is preferred to blend the silica with the chlorine-containing polymer before blending the latter with the chlorine-free polymer.

What is claimed is:

1. A thermally stable, chemical-resistant fluoroelastomer combination of improved processing and handling properties comprising at least two highly fluorinated curable elastomeric polymers containing at least 37 percent by weight of carbon-bonded fluorine, one of said polymers being a chlorine-free polymer and the other of said polymers being a chlorine-containing polymer, wherein one of said polymers is in the form of a continuous phase and the other of said polymers is insoluble in, and dispersed throughout, said continuous phase polymer, and wherein said chlorine-containing polymer represents about 3 to 97 weight percent of said fluoroelastomer combination, said chlorine containing polymer being an elastomeric vinylidene fluoride/chlorotrifluoroethylene copolymer.

2. A thermally stable, chemical-resistant fluoroelastomer combination in accordance with claim 1, wherein said elastomeric polymers are cured.

3. A thermally stable, chemical-resistant fluoroelastomer combination in accordance with claim 1, wherein said fluoroelastomer combination contains 3 to 30 weight percent chlorine-containing polymer dispersed throughout a continuous phase of chlorine-free polymer.

4. A thermally stable, chemical-resistant fluoroelastomer combination in accordance with claim 1, wherein said fluoroelastomer combination contains about 3 to 40 weight percent of chlorine-free polymer dispersed throughout a continuous phase of chlorine-containing polymer.

5. A thermally stable, chemical-resistant fluoroelastomer combination of improved processing and handling properties comprising at least two highly fluorinated elastomeric polymers, one of said polymers comprising a major amount of an elastomeric vinylidene fluoride/perfluoropropene copolymer, and another of said polymers, which represents about 3 to 97 weight percent of said fluoroelastomer combination, comprising a major amount of an elastomeric vinylidene fluoride/chlorotrifluoroethylene copolymer, wherein one of said polymers is dispersed throughout, and soluble in, another of said polymers.

* * * * *